United States Patent
Girault et al.

(10) Patent No.: US 7,382,875 B2
(45) Date of Patent: Jun. 3, 2008

(54) CRYPTOGRAPHIC METHOD FOR DISTRIBUTING LOAD AMONG SEVERAL ENTITIES AND DEVICES THEREFOR

(75) Inventors: Marc Girault, Caen (FR); Jean-Jacques Quisquater, Rhode Saint-Genese (BE)

(73) Assignees: France Telecom, Paris (FR); Math Riszk, Louvain La Neuve (BE)

( * ) Notice: Subject to any disclaimer, the term of this patent is extended or adjusted under 35 U.S.C. 154(b) by 576 days.

(21) Appl. No.: 10/499,563

(22) PCT Filed: Dec. 16, 2002

(86) PCT No.: PCT/FR02/04366

§ 371 (c)(1),
(2), (4) Date: Jun. 21, 2004

(87) PCT Pub. No.: WO03/055134

PCT Pub. Date: Jul. 3, 2003

(65) Prior Publication Data

US 2005/0220298 A1    Oct. 6, 2005

(30) Foreign Application Priority Data

Dec. 21, 2001  (FR)  .................................. 01 16789

(51) Int. Cl.
*H04L 9/00* (2006.01)
(52) U.S. Cl. ...................................................... 380/28
(58) Field of Classification Search ................ 380/28, 380/30; 726/29, 17, 4
See application file for complete search history.

(56) References Cited

U.S. PATENT DOCUMENTS 6,226,383 B1 *  5/2001  Jablon ......................... 380/30
7,139,917 B2 *  11/2006  Jablon ........................ 713/183

FOREIGN PATENT DOCUMENTS

WO    WO 00/69114 A1    11/2000

OTHER PUBLICATIONS

Bruce Schneier, Applied Cryptography Second Edition, 1996.*
Matsumoto et al., "Speeding Up Secret Computations with Insecure Auxiliary Devices," Advances in Cryptology, Santa Barbara, Aug. 21-25, 1988, Proceedings of the Conference on the Theory and Application of Cryptography (Crypto), Berlin, Springer, Germany, pp. 497-506 (1988).

* cited by examiner

*Primary Examiner*—Gilberto Barrón, Jr.
*Assistant Examiner*—Andrew L Nalven
(74) *Attorney, Agent, or Firm*—Drinker Biddle & Reath LLP

(57) ABSTRACT

The invention concerns a cryptographic method whereby a second entity (B) verifies by means of a public key, a proof provided by a first entity (A), which consists in the generation by the first entity (A) of a first random number r much higher than any first integer s included in a private key kept secret by the first entity (A). The first entity (A) generates a first element of proof resulting from a modulo n exponentiation of a first integer G included or not in said public key and whereof the exponent is the first random number r. In combination with the first element of proof, a so-called common number, is generated so that the second entity (B) and the first entity (A) should have knowledge of the common number. The first entity (A) generates an image y of said private key by linear combination of the first random number r and of at least a first private key integer s. At least a multiplicative coefficient of the linear combination is said common number. Any one entity generates a second element of proof Y equal to a power modulo n of a second integer G included or not in said public key and whereof the exponent is the image y of said common number, and sends the second element of proof Y to the first entity (B). The second entity (B) verifies whether the first element of proof is in conformity with a product modulo n of a power of the second element of proof Y whereof the exponent is a third integer e and of a power of a fourth integer v included in said public key whereof the exponent is said common number c.

57 Claims, 6 Drawing Sheets

US 7,382,875 B2

CRYPTOGRAPHIC METHOD FOR DISTRIBUTING LOAD AMONG SEVERAL ENTITIES AND DEVICES THEREFOR

CROSS-REFERENCE TO RELATED APPLICATIONS

This application is a national phase of the PCT/FR02/04366 filed Dec. 16, 2002, that claims the benefit of French Application No. 0116789 filed Dec. 21, 2001, the entire content of which is incorporated herein by reference.

BACKGROUND OF THE INVENTION

1. Field of the Invention

The invention relates to the technical field of cryptography, and more precisely to what is called public key cryptography. In this type of cryptography, a user owns a pair of keys for a given use. Said pair of keys consists of a private key that this user keeps secret and an associated public key that this user may communicate to other users. For example, in the case of a pair of keys dedicated to confidentiality, the public key is then used to encipher the data, whereas the secret key is used to decipher it, that is to say to re-establish this data in clear.

2. Related Art

Public key cryptography is very widely used insofar as, unlike secret key cryptography, it does not require the interlocutors to share the same secret in order to establish a security-protected communication. However, this advantage in terms of security is accompanied by a disadvantage in terms of performance, since public key cryptography methods, also called "public key schemes", are often one hundred or one thousand times slower than secret key cryptography methods, also called "secret key schemes". A very great challenge is therefore to find public key cryptography methods that can be rapidly executed so as to be able to use them in resource-limited environments, such as standard microprocessor cards, with or without contacts.

Most public key schemes existing at the present time rely on the difficulty of mathematical problems in the field of arithmetic (or "number theory"). Thus, the security of the RSA (Rivest, Shamir, Adleman) numerical signature and encryption scheme is based on the difficulty of the problem of factorizing integers: given a very large integer (having more than 500 bits) obtained privately by multiplying together two or more prime numbers of comparable size, no effective method exists at the present time for recovering these prime numbers.

Other public key schemes, such as the ElGamal digital signature or encryption scheme, rely for their security on the difficulty of what is called the "discrete logarithm problem". This problem may be expressed in its most general case as follows: let E be a set provided with an operation (i.e. with a function which, having two elements a and b, associates an element denoted "a.b" or "ab", and called the "product of a and b"), let g be an element of E, let r be a large integer and let y be the integer defined by: $y = g^r$ (that is to say the product $g \cdot g \cdot \ldots \cdot g$, with g occurring r times); it is then unfeasible to recover r from g and y.

The invention relates more particularly to the technical field of entity authentication, also called "identification", and also that of the authentication of a message and of its digital signature by means of public key cryptographic techniques. In such methods, the authenticated entity, called the "prover" possesses a secret or private key and an associated public key. The prover uses the secret key to produce an authentication value. The authenticating entity, called the "verifier", needs only the public key of the prover to verify the authentication value.

The invention relates more particularly still to authentication methods called "zero-knowledge disclosure". This means that the authentication takes place using a protocol which, in a proven manner, reveals nothing about the secret key of the authenticated entity, this being so however many times it is used. From this type of scheme it is known how to deduce, using standard techniques, schemes for authenticating a message and a digital signature of this message.

The invention relates even more particularly to methods whose security relies both on the difficulty of the problem of factorizing integers and that of the discrete logarithm problem.

The invention is applicable in any system using public key cryptography to protect the security of their elements and/or their transactions, and more particularly in systems in which the number of calculations performed by the various parties constitutes, at least for one of them, a critical parameter, either because it does not have available a coprocessor specialized in cryptographic calculations, often called a "cryptoprocessor", so as to speed up the calculations, or because it is capable of carrying out a large number of calculations simultaneously, for example in the case of central server, or for any other reason.

A typical application is electronic payment, by bank card or by electronic purse. In the case of proximity payment, the payment terminal is in a public place, prompting the use of public key cryptography methods, so as not to store a master key. To reduce the overall costs of such a system, it may be desirable either for the card to be a standard microprocessor card, that is to say a card not provided with a cryptoprocessor, or for the security-protected microprocessor contained in the terminal itself to be of standard type, or for both of these. Depending on the case and on the cryptographic method adopted, the prior art known at the present time does achieve one or other of these objectives, but does not allow both to be easily achieved simultaneously, while complying with the constraints of the system. An example of such a constraint is that the payment shall be effected in less than one second, or even in less than 150 milliseconds in the case of a contactless transaction, or even in a few milliseconds in the case of a motorway tollgate.

One limitation of all the cryptographic methods known hitherto is that the number of calculations that each of the parties has to perform is fixed by the method itself and cannot be modified. In particular, it is not possible to vary the distribution of the calculations between the prover and a third party not necessarily in confidence, so as to adapt to such or such an environment. This prevents the same method from being able to be used in a variety of environments in which the constraints are different.

SUMMARY OF THE INVENTION

The invention specifies public key cryptographic methods in which it is possible to distribute a substantial quantity of calculations between at least two of the several entities involved, without this distribution changing the level of security offered by said methods. In the case of a public key digital signature or authentication method, the invention is particularly useful for lightening the task of the prover by reducing the number of calculations to be performed thereby. The invention makes it possible to delegate some of the calculations to another entity, without it being necessary to take this other entity into any confidence. More generally, the invention allows all or some of the calculations to be distributed in any manner between several entities in question in such a way that the constraints associated with a given application are met.

Considering a cryptographic method in which a first entity generates, by means of a private key kept secret by the first entity, a proof verifiable by a second entity by means of a public key associated with said private key, the method comprises a step in which at least one element of proof is at least partly generated by open digital processing of a data item that does not allow said private key to be recovered.

The expression "open digital processing" is understood to mean a digital processing operation that does not benefit from a particular protection against possible intrusions. This open digital processing operation is executable by any entity. The abovementioned data item is, for example, an image of said private key.

This possibility of distributing the load allows one and the same cryptographic method to be used in many applications and environments with a very large variety of constraints. In particular, it may allow transactions to be carried out in a shorter time using chips with limited computing capacity.

Cryptographic methods are known that use a property of finite groups containing, for example, n integers and provided with an internal composition law such as multiplication. It is practically impossible to recover an original exponent of an exponentiation, in particular when n is a number composed of at least two very large prime numbers.

In particular, the method according to the invention may further comprises:

- a first step in which the first entity generates a first element of proof by means of a first random number kept secret by the first entity;
- a second step in which one or more what are called common numbers are generated in association with the first element of proof, so that the first entity and the second entity should have knowledge of said common number or numbers;
- a third step in which the first entity generates an image of said private key by combining at least a first private key integer with the first random number and at least one of said common numbers;
- a fourth step in which a second element of proof is generated by applying, to the image of said private key, an open digital processing operation executable by any entity, so as to allow the second entity to verify a match of the first element of proof with the second element of proof by applying a first part of said public key to the second element of proof and at least a second part of said public key to the at least one of said common numbers.

The expression "generation of a common number in association with the first element of proof" is understood to mean that the generation of a common number for which the first element of proof must be known beforehand. This generation may be purely random and independent of the first element of proof or may depend on the first element of proof. With this association, it is impossible to return to the first element of proof when the common number is generated.

More particularly:

in the first step, the first entity generates the first random number r, which is very much greater than any first integer s contained in a private key kept secret by the first entity, and the first entity generates the first element of proof obtained after raising, to a power modulo n, a first integer G which may or may not be contained in said public key, and the exponent of which is the first random number r;

in the third step, the first entity generates the image y of said private key by a linear combination of the first random number r and of at least a first private key integer s, at least one multiplicative coefficient of said linear combination being said common number or one of said common numbers;

in the fourth step, the second element of proof Y generated is equal to a power modulo n of a second integer g which may or may not be contained in said public key and the exponent of which is the image y of the private key, the second integer g being such that the first public key integer G is a power modulo n of the second integer g with, as exponent, a third integer e which may or may not be contained in said public key.

It should be firstly noted that knowledge of the private key image generated in the third step provides no information about the private key, as the latter is masked by the linear combination with the first random number, the first element of proof of which reveals nothing. Secondly, knowledge of the first element of proof and of the public key does not allow the second element of proof to be generated without knowledge of the private key image, the generation of which in the second step can be carried out only by the second entity which alone has knowledge of the private key and the random number. The first entity may have a limited computing resources for carrying out the fifth step, since relatively small values of the third integer and of the common number are sufficient for reliable verification of a match with the first element of proof.

The fourth step may be executed by the first entity. However, the cost of calculating the power in the fourth step is considerable, since the exponent is of large value.

Advantageously, the fourth step is executed by any entity that receives the private key image y from the first entity. As explained above, knowledge of the private key image by the any entity does not compromise the security of the method. Execution of the fourth step by the any entity that is other than the first entity lightens the burden of the first entity. The any entity is optionally the second entity or an intermediate entity.

Also advantageously, the fourth step comprises:

- a first substep in which the first entity decomposes the image y into a first partial image y' represented by the u low-order bits of a data word which represents the image y and into a second partial image y" represented by the remaining high-order bits of said data word, in which first substep the first entity generates a first component Y' and a second component g' of the second element of proof, said components being such that:

$$Y' = g^{y'} \text{ modulo } n$$

$$g' = g^{2^u} \text{ modulo } n$$

and in which the first entity sends the first component Y', the second component g' and the second partial image y" to an intermediate entity;

- a second substep in which the any entity generates the second element of proof Y by multiplying the first component Y' by a power of the second component g' with the second partial image y" as exponent, and in which the any entity sends the second element of proof Y to the second entity.

The value of y', which is therefore less than the value of y, requires only limited computing resources in the second entity to generate the first component Y' and the second component g'. Since the second partial image and the two components Y' and g' are sufficient for the any entity to generate the second element of proof without complete knowledge of the private key image, the security of the method is enhanced.

Particularly when the cryptographic method is used to authenticate a dialogue between the first entity and the second entity, the second step is executed by the second entity which, for the first element of proof received from the first entity, chooses at least one common number in a security interval and sends said common number to the first entity.

This makes it possible for the second entity to be sure that the first entity has received the common number for generating the second element of proof as a match with the first element of proof within the dialogue.

More particularly in the fifth step, the match is verified when the first element of proof x is equal to the product modulo n of the power of the second element of proof Y, the exponent of which is the third integer e, and of the power of the fourth integer v contained in said public key, the exponent of which is said common number c.

More particularly still and differently when the dialogue comprises the sending of a message M by the first entity, the match is verified in the fifth step when the first element of proof is equal to a function of the digital message M to which the first element of proof is attached and of the product modulo n of the power of the second element of proof Y, the exponent of which is the third integer e, and of the power of the fourth integer v contained in said public key, the exponent of which is said common number c.

More particularly and differently when the cryptographic method is used for a message signature M, the second step is executed by the first entity which generates at least one common number on the basis of the first element of proof and of the digital message M to which said common number is attached.

More particularly in the fifth step, the match is verified when the common number is equal to a function of the digital message M and of the product modulo n of the power of the second element of proof Y, the exponent of which is the third integer e, and of the power of the fourth integer v contained in said public key, the exponent of which is said common number c.

The invention also relates to a prover device, a verifier device and an intermediary device that are designed to implement the cryptographic method.

Considering a prover device, provided with a private key kept secret and protected against any intrusion, for generating a proof, a verification of which using a public key associated with said private key makes it possible to guarantee that the prover device is the origin of said proof, the prover device comprises:

calculation means designed to generate a first element of proof, on the basis of a first random number kept secret in the prover device, and to generate an image of said private key by combining at least a first private key integer with the first random number and at least one of several common numbers associated with the first element of proof, in such a way that it is possible to generate a second element of proof by applying an open digital processing operation to said private key image that makes it possible to verify a match of the first element of proof with the second element of proof by applying a first part of said public key to the second element of proof and at least a second part of said public key to at least one of said common numbers;

communication means designed to transmit at least said first element of proof.

Advantageously in the prover device:

the calculation means are, on the one hand, designed to generate the first random number r, which is very much greater than any first integer s contained in the private key, kept secret, and to generate the first element of proof by raising, to a power modulo n, a first integer G which may or may not be contained in said public key with, as exponent, the first random number r;

the calculation means are, on the other hand, designed to generate the image y of said private key by a linear combination of the first random number r and of at least a first private key integer s, at least one multiplicative coefficient of said linear combination being said common number or one of said common numbers.

Various modifications of the prover device are preferred depending on the version of the method to be implemented.

For example, the communication means are also designed to receive said common number(s) after having transmitted the first element of proof.

Preferably, the communication means are designed to transmit the private key image.

Optionally, the calculation means are designed to generate the second element of proof.

Advantageously, the calculation means are designed to decompose the image y into a first partial image y' represented by the u low-order bits of a data word which represents the image y and into a second partial image y" represented by the remaining high-order bits of said data word, and to generate a first component Y' and a second component g' of the second element of proof, said components being such that:

$$Y'=g^{y'} \text{ modulo } n$$

$$g'=g^{2^u} \text{ modulo } n$$

where g is a second integer such that the first public key integer G is a power modulo n of the second integer g with, as exponent, a third integer e contained in said public key, the communication means are designed to transmit the first component Y', the second component g' and the second partial image y".

In the particular case of a message signature, the calculation means are designed to generate at least one common number on the basis of the first element of proof and of a digital message M to which said common number is attached.

According to various alternative embodiments, the calculation means are designed to generate the first element of proof by raising, to a power modulo n, a first integer G which may or may not be contained in said public key, and the exponent of which is the first random number r.

According to a first alternative embodiment, the first public key integer G and a fourth public key integer v are given respectively by the formulae:

$$G=g^e \text{ modulo } n$$

$$v=G^{-s} \text{ modulo } n.$$

According to a second alternative embodiment, the first public key integer G and a fourth public key integer v are given respectively by the formulae:

$$G = g^e \text{ modulo } n$$

$$v = G^s \text{ modulo } n.$$

According to a third alternative embodiment, the first public key integer G and a fourth public key integer v are given respectively by the formulae:

$$G = g^{-e} \text{ modulo } n$$

$$v = G^{-s} \text{ modulo } n.$$

According to a fourth alternative embodiment, the calculation means are designed to generate the private key image y by a linear combination of two common numbers a and b according to the formula:

$$y = a \cdot r + b \cdot s.$$

According to a fifth alternative embodiment, when the private key comprises several secret numbers s1, s2, etc.:
  the calculation means are designed to generate as many common numbers c1, c2, etc. that are associated with the first element of proof x;
  the calculation means are designed to generate the private key image by a linear combination according the formula:

$$y = r + c1 \cdot s1 + c2 \cdot s2 + \text{ etc.}$$

According to a sixth alternative embodiment, when the public key comprises specifically the modulus n whose prime numbers are kept secret in the prover device, the calculation means are designed to calculate the exponentiations using a technique called Chinese remainders.

The prover device is improved when the public key comprises a quantity k of precalculated values of the first element of proof x, the calculation means are designed to iterate k times each execution with, for each iteration, a different value of the first element of proof.

Optionally, the first element of proof is equal to a function f of the power modulo n of the first integer G which may or may not be contained in said public key and the exponent of which is the first random number r.

Considering a verifier device for verifying that a proof has been issued by a prover device provided with a private key kept secret by the prover device, using a public key associated with said private key, the verifier device comprises:
  communication means designed to receive a first element of proof and a second element of proof;
  calculation means designed to verify a match of the first element of proof with the second element of proof by applying a first part of said public key to the second element of proof and at least a second part of said public key to at least one of several common numbers generated in association with the first element of proof.

Advantageously in the verifier device, the calculation means are designed to verify that the first element of proof matches with a product modulo n of a power of the second element of proof Y, the exponent of which is a third integer e, and of a power of a fourth integer v, the exponent of which is said common number c, the third integer and the fourth integer being contained in said public key.

Also advantageously, the calculation means are designed to choose at least one common number within a security interval after receiving the first element of proof and in that the communication means are designed to transmit said common number.

In particular, the calculation means are designed to declare the match verified when the first element of proof x is equal to the product modulo n of the power of the second element of proof Y, the exponent of which is the third integer e, and of the power of the fourth integer v contained in said public key, the exponent of which is said common number c.

More particularly, the calculation means are designed to declare the match verified when the first element of proof is equal to a function of a digital message M to which the first element of proof is attached and of the product modulo n of the power of the second element of proof Y, the exponent of which is the third integer e, and of the power of the fourth integer v contained in said public key, the exponent of which is said common number c.

Differently, the calculation means are designed to declare the match verified when the common number is equal to a function of a digital message M and of the product modulo n of the power of the second element of proof Y, the exponent of which is the third integer e, and of the power of the fourth integer v contained in said public key, the exponent of which is said common number c.

The equality is verified in the verifier device by the formula:

$$x = Y^e v^c \text{ modulo } n;$$

or by the formula:

$$Y_e = v^c x \text{ modulo } n;$$

or by the formula:

$$Y^e x = v^c \text{ modulo } n;$$

or else the match is verified by the equality:

$$Y^e v^b = x^a \text{ modulo } n.$$

When the private key comprises several secret numbers s1, s2, etc., the calculation means are designed to choose as many common numbers c1, c2, etc. for the first element of proof x and the calculation means are designed to verify the match by as many fourth public key integers v1, v2, etc. by means of the equality:

$$Y^e v1^{c2} V2^{c2} \text{ etc.} = x \text{ modulo } n.$$

In an alternative embodiment of the verifier device, the calculation means comprise, in memory, at least one precalculated value of the first element of proof x considered as part of the public key.

In particular, the calculation means comprise, in memory, a quantity k of precalculated values of the first element of proof $x_i$ the communication means are designed to receive k second elements of proof and the calculation means are designed to verify a match of each second element of proof received with a different value of the first element of proof.

In another alternative embodiment of the verifier device, when the first element of proof is equal to a function f of the power modulo n of the first integer G which may or may not be contained in said public key, and the exponent of which is the first random number r, the calculation means are designed to carry but the verification on the result of this function.

Considering an intermediary device for being introduced downstream of a prover device for the purpose of generating a proof based on a private key kept secret by the prover device, said proof being verifiable by means of a public key associated with said private key, the intermediary device comprises calculation means for generating at least one element of proof by open digital processing of an image of said private key, said private key image not allowing said private key to be recovered.

In particular, the device comprises communication means designed to receive said private key image y.

According to one possible alternative embodiment, the calculation means are designed to generate the second element of proof Y by raising, to a power modulo n, a second integer g contained in said public key, the exponent of which is the private key image y.

According to another possible alternative embodiment, the intermediary device comprises communication means designed to receive a first partial image y' of the private key, a first component Y' and a second component g' of the second element of proof and the calculation means are designed to generate the second element of proof Y by multiplying the first component Y' by a power of the second component g' with the second partial image y" as exponent.

Preferably, the communication means of the intermediary device are designed to transmit the second element of proof Y to a verifier device.

BRIEF DESCRIPTION OF THE DRAWINGS

The invention will be more clearly understood from the illustrative examples, described below with reference to the appended drawings in which.

DESCRIPTION OF PREFERRED EMBODIMENTS

Figure 1:
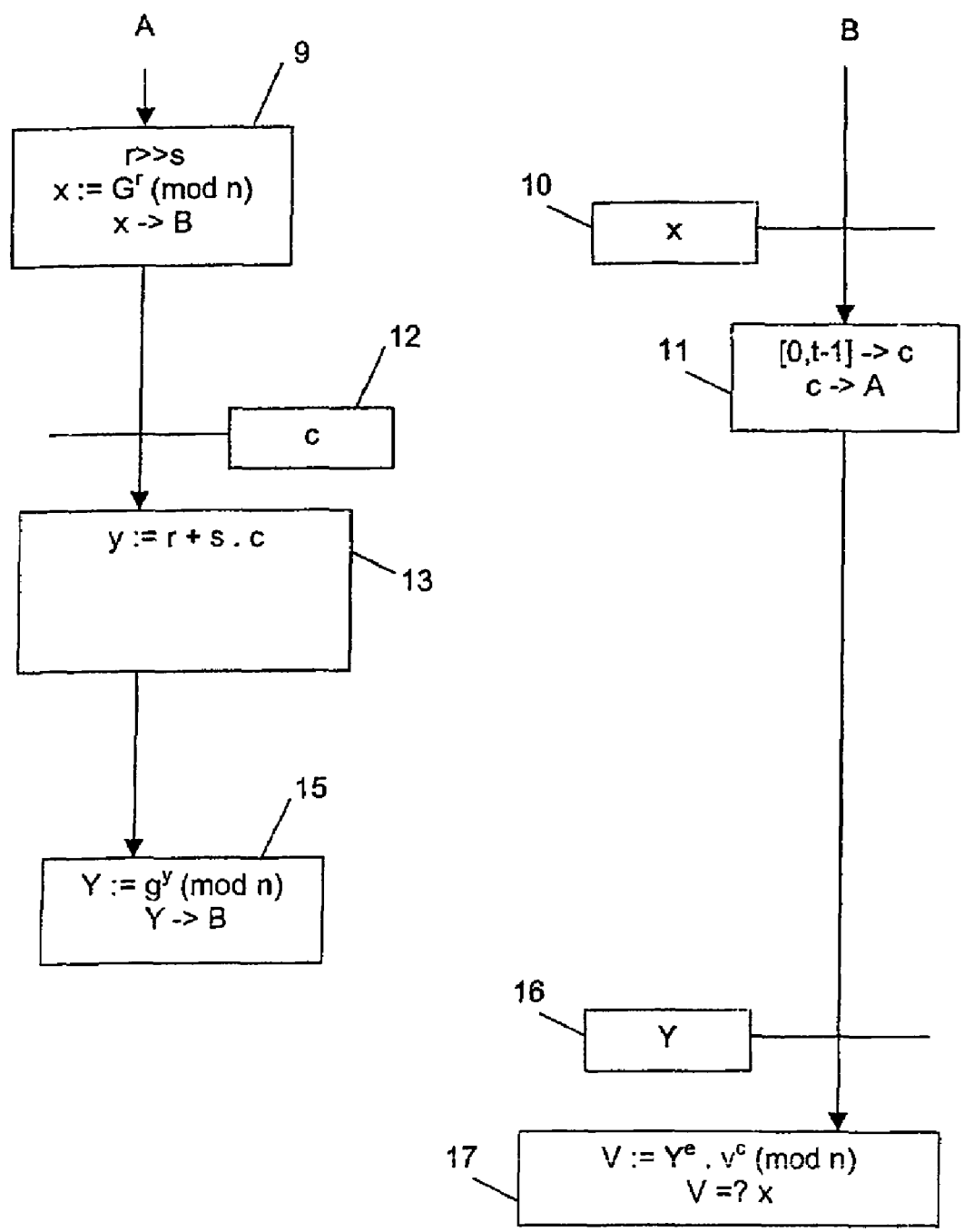
FIG. 1 shows steps of an authentication method for authenticating a second entity by a first entity according to the invention.

The mode of implementation described below is an entity authentication or identification method. It allows a prover A to convince a verifier B of its authenticity. This method may be converted into a method of authenticating a message or a message digital signature. Its security relies on the joint difficulty of factorizing large integers.

In accordance with the objective and with the results explained above, this method comprises two options depending on the way in which the calculations are distributed between several entities. Let n be a large composed integer and let five positive integers e, g, G, s and v be positive and less than n such that:

$$G=g^e(mod\ n) \text{ and } v=G^{-s}(mod\ n).$$

The public key of the provers is therefore formed wholly or partly from the quintuplet (n, e, g, G, v), depending on the option chosen, whereas the private key is formed from at least the integer s kept secret by the prover. The public key itself may be decomposed into a generic part in the sense that it is common to several provers and into a specific part in the sense that it is different for each prover.

Two positive integers k and t, called security parameters, are also defined. In all the options, it will be assumed that a first entity—the verifier B—already knows all the public parameters needed to verify that a proof is given by a second entity—the prover A, namely its identity, its public key, its public key certificate, etc.

According to a first option, the public key is the triplet (n, e, v) and the authentication of the entity A by the entity B is performed by iterating k times the protocol presently described with reference to FIG. 1.

In a first step 9, the entity A generates a first random number r very much greater than s, calculates $x=G^r \pmod n$ and sends x to the entity B. As is known; the entities A and B are of the computer type or of the chip card type. The expression "(mod n)" denotes modulo n, that is to say, as is known, the result of the calculation is equal to the remainder of the integer division of the result of the operation in question by the integer n, which is generally called the modulus. Here, the integer x constitutes a first element of proof as only the entity that generates the random number r is capable of generating the number x. The random number r is not communicated by the entity that generates it. From known number theory, the number r is chosen to be large enough for knowledge of the first integer G and of the modulus n not to allow the number r to be recovered from the number x. This first element of proof is not sufficient as such an element can be generated from any random number, by any entity, if the first integer G is contained in the public key. It will be noted that, in the method described with reference to FIG. 1, the integer G is not necessarily contained in the public key.

Receipt by the entity B of the first element of proof x validates a transition 10 which then activates a second step 11.

In step 11, the entity B chooses at random an integer c within an interval [0, t−1] called the security interval and sends the number c to the entity A. Thus, the number c, generated in association with the first element of proof by the entity B, is common to the entities A and B and also to any other entity infiltrating the dialogue between the entities A and B.

Receipt of the common number c by the entity A validates a transition 12 which then activates a third step 13.

In the step 13, the entity A calculates y=r+sc. Thus, the entity A generates an image y of the private key in the form of a linear combination of the number r and the number s, the multiplicative coefficient of which is the common number c. Since the random number r is very large and not communicated, knowledge of the image y does not allow the product sc to be recovered and consequently prevents recovery of the private key number s, which therefore remains kept secret by the entity A. Since only entity A knows the number s, only the entity A can generate an image that integrates the common number c.

A fourth step 15 here is activated immediately after step 13. In step 15, the entity A calculates $Y=g^y \pmod n$ and sends Y to B. Thus, the entity A generates here a second element of proof Y. It will be noted here that the second integer g is not necessarily contained in the public key.

Receipt of the second element of proof Y by the entity B validates a transition 16, which then activates a fifth step 17.

In step 17, the entity B verifies that: $Y^e v^c = x \pmod n$. Although, as seen above, the second element of proof communicates no information about the private key, the second element of proof Y is such that:

$$Y=g^{r+sc}(mod\ n).$$

Therefore raising the second element of proof Y to a power whose exponent is the third integer e of the public key results in:

$$Y^e = g^{(r+sc)e} = G^{r+sc} (mod\ n).$$

Moreover, although in accordance with number theory the fourth integer v communicates no information about the private key, said integer in fact is such that:

$$v^c = G^{-sc} (mod\ n).$$

Thus, without r being communicated at any time, the equality:

$$Y^e v^c = G^r = x (mod\ n)$$

certifies that the entity A, which alone knows s, knows c.

Let us consider an imposter as being an entity attempting to pass off as A, without knowing the secret s, then the probability of not detecting this imposter is equal to 1/kt. For many applications, the product kt may be chosen to be relatively small, for example of the order of $2^{16}$.

Preferably, k=1 and t=e, in which case the probability defined above is equal 1/e and there is only one verification equation to be applied. If e is equal for example to $2^{16}$, then the verification will be relatively rapid since the exponents e and c are relatively small. This verification may even be accelerated by calculating in advance, at the end of step 11 or beforehand:

$$z = v^c (mod\ n).$$

Thus, in the fourth step, B now has only to verify that $Y^e z = x (mod\ n)$. Other values of k and t are possible.

Many different ways of optimizing this basic protocol are possible. For example, $v = G^{-s} (mod\ n)$ may be replaced with $v = G^s (mod\ n)$, in which case the verification equation becomes $Y^e = x v^c (mod\ n)$.

Again, for example, it is possible to replace $G = g^e (mod\ n)$ with $G = g^{-e} (mod\ n)$, in which case the verification equation becomes $x Y^e = v^c (mod\ n)$.

Again, for example, it is possible to replace c with a pair of positive or negative integers (a,b) and to replace y=r+sc with y=ar+bs, in which case the verification equation becomes $Y^e v^b = x^a (mod\ n)$.

Again, for example, it is possible to choose several secret numbers $s_1$, $s_2$, etc., several public keys $v_1$, $v_2$, etc. and several integers $c_1$, $c_2$, etc. and to replace y=r+sc with $y = r + s_1 c_1 + s_2 c_2 +$ etc., in which case the verification equation becomes $Y^e v_1^{c_1} v_2^{c_2} = x (mod\ n)$.

If n is contained in the specific part of the public key and if the prime factors of n are known by A, then the first step may be accelerated using what is called the "Chinese remainders" technique.

The first step may be carried out in advance. In addition, the k values of x may form part of A's public key, in which case the protocol commences directly with the second step.

The number x may be replaced with a value f(x) where f is a function, for example equal to (or including) a cryptographic hash function, in which case the verification equation becomes: $f(Y^e v^c (mod\ n)) = x$. It is possible to combine all or some of the above modifications.

Remarkably, the calculation of Y may also be performed by any entity other than A, and this may be done without any loss of security. In this case, A calculates only y and provides this entity with y. Firstly, knowledge of y provides no information about s, since the product sc is "masked" by the random number r. Secondly, it is practically impossible for a fraudster to manufacture Y from all the pieces since, given n, e, v, x and c, it is unfeasible to find a value of Y that satisfies the verification equation of the fourth step, if the factorization is a difficult problem.

According to a second option explained with reference to FIG. 2, the public key is the quadruplet (n, e, g, v) and authentication of the entity A by the entity B is performed by iterating the following protocol k times, where C denotes any entity other than A.

The method is carried out in the same way as that described with reference to FIG. 1 up to step 13. Referring to FIG. 2, step 13 is modified in that the entity A sends the private key image y to an intermediate entity C. As was seen previously, the image y gives no information about the private key.

Receipt of the image y by the entity C validates a transition 14, which then activates the fourth step 15.

In step 15, it is in this case the intermediate entity C that calculates the second element of proof $Y = g^y (mod\ n)$ and sends Y to B.

The method then continues in the same way as that described with reference to FIG. 1 via the transition 16 and step 17.

Physically, the intermediate entity C is, for example, embodied in a chip, which is not necessarily security-protected, contained in the prover's security device such as chip card, in the verifier's security device such as a payment terminal, or else in another device, such as a computer. Security lies in the fact that the entity C cannot by itself find a value Y that is suitable, that is to say such that the verification equation is satisfied.

Figure 3:
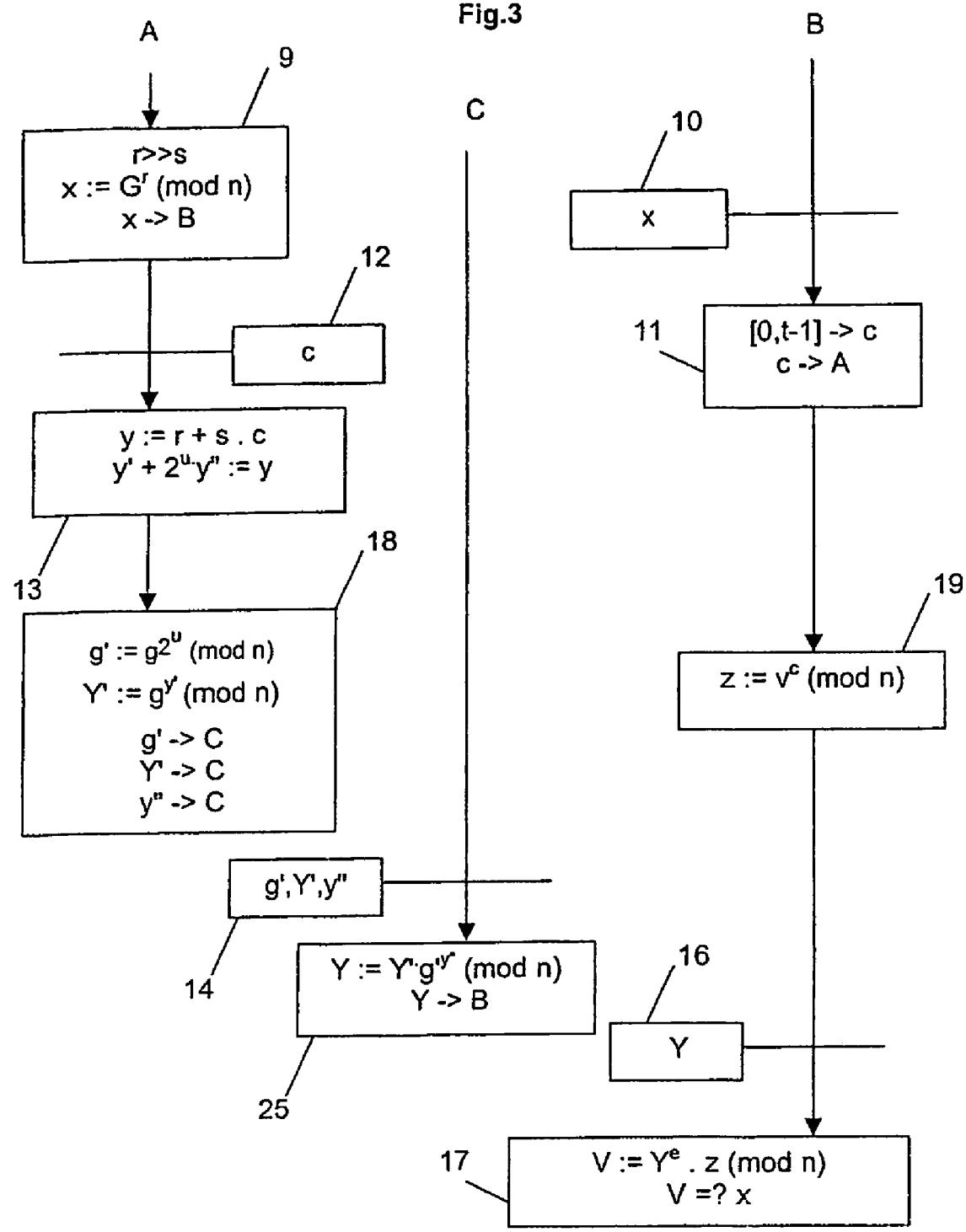
FIG. 3 shows a second alternative embodiment of the authentication method involving an intermediate entity.

In a third option, described with reference to FIG. 3, the calculation of Y is divided between the entities A and C. There is a large variety of ways to share this calculation. Here again, the method is carried out in the same way as that described with reference to FIG. 1 up to step 13. Advantageously in step 13, the image y is decomposed according to the formula:

$$y = y' + 2^u y''$$

In this formula, u is a positive integer and y' is an integer less than $2^u$. The decomposition is easy to perform. In a data word representing the image y, the first partial image y' is represented by the u low-order bits of this word.

The second partial image is represented by the remaining high-order bits of this data word.

The fourth step, for calculating the second element of proof, is in this case decomposed into two substeps 18 and 25.

The first substep 18 is carried out by the entity A directly after step 13. In the substep 18, the entity A calculates a first component Y' of the second element of proof according to the formula:

$$Y' = g^{y'} (mod\ n).$$

The calculation of the first component Y' requires substantially less resources that the complete calculation of the second element of proof, since the first partial image y' has a value substantially less than the image y, by choosing a relatively low value of u, for example of the order of eight or sixteen.

In the substep 18, the entity A thus calculates a second component g' of the second element of proof according to the formula:

$$g' = g^{2^u} (mod\ n).$$

The calculation of the first component g' requires few resources of computation because there are only u squaring to perform, the first squaring being performed on the second integer g and then each following squaring being carried out on the result of the next squaring modulo n.

At the end of substep 18, the entity A sends the two components g', Y' and the second partial image y" to the intermediate entity C. Security is enhanced by the fact that the private key image is not communicated in its entirety. The computing load of the entity A is reduced by the fact that the second element of proof is not calculated in its entirety by the entity A.

Receipt of the two components g', Y' and the second partial image y" by the entity C therefore validates the transition 14 in order to activate the second substep 25 in the intermediate entity C.

In substep 25, the entity C calculates $Y=Y'g'^{y''}(\bmod n)$ and sends the second element of proof thus generated, Y, to the entity B.

The procedure then continues in the same way as that described with reference to FIG. 1 via the transition 16 and step 17.

Advantageously, before validation of the transition 16, the entity B carries out a step 19 in which, in order facilitate the calculation of V in step 17, a number z calculated by:

$$z=v^c(\bmod n).$$

Figure 2:
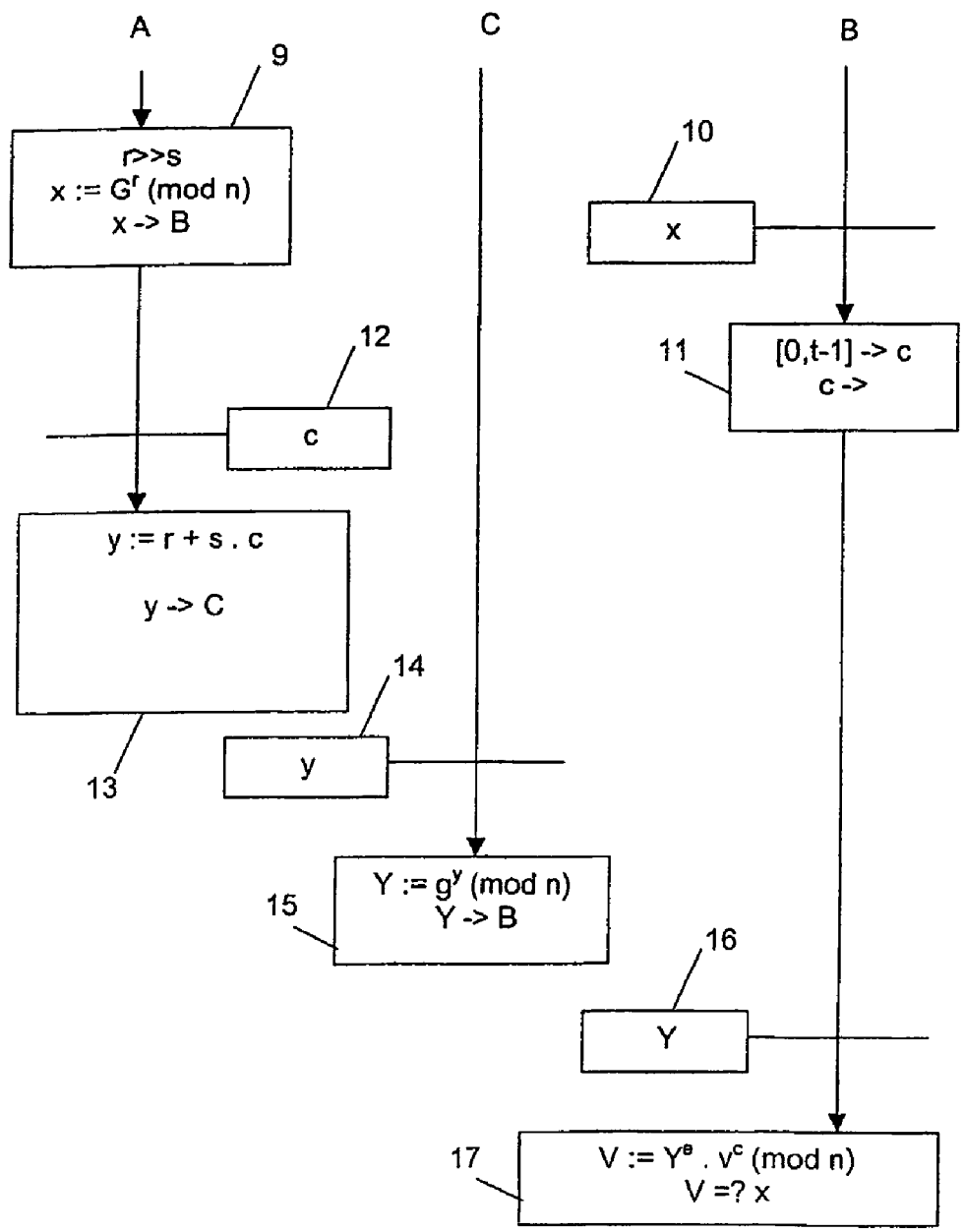
FIG. 2 shows a first alternative embodiment of the authentication method involving an intermediate entity.
Figure 4:
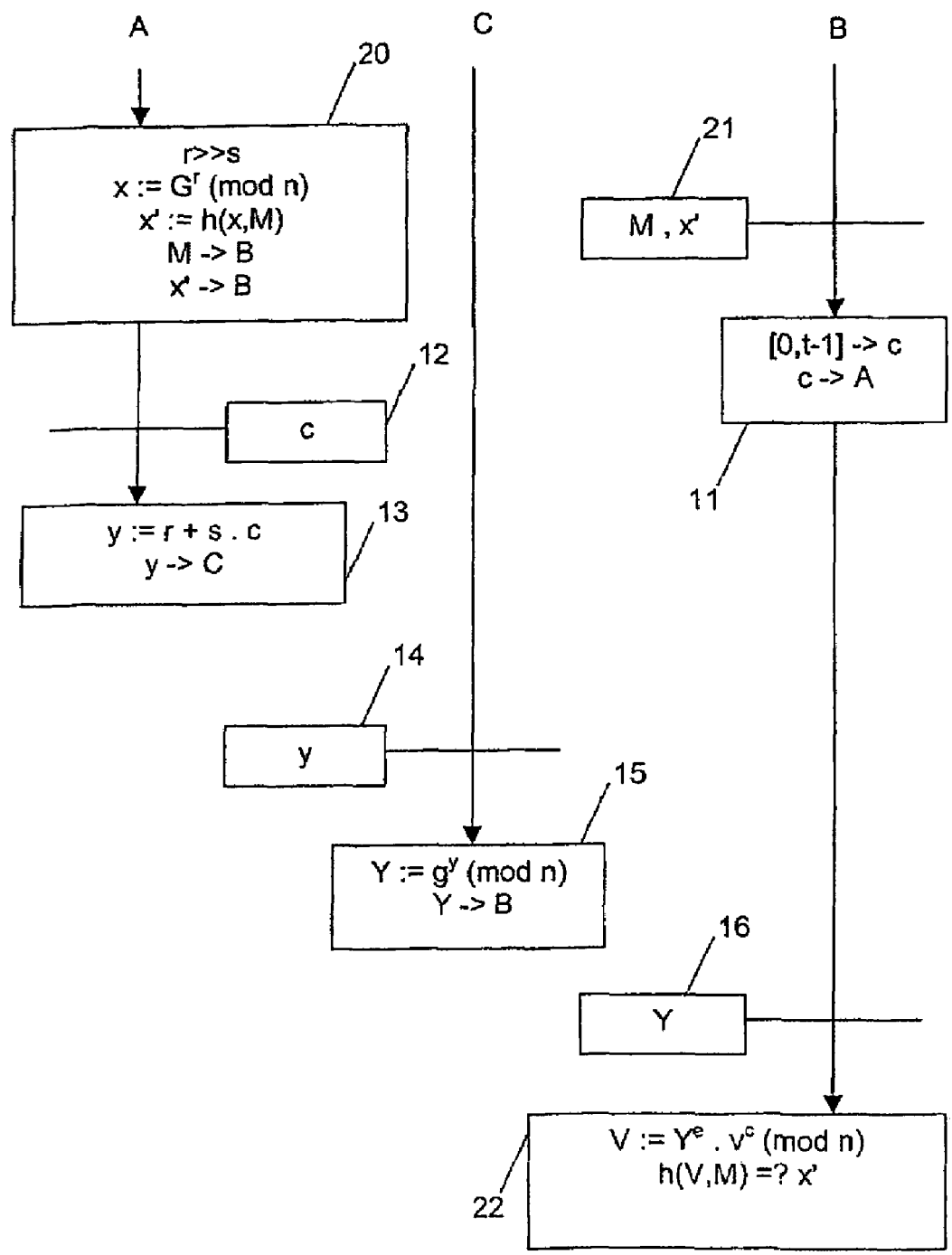
FIG. 4 shows steps of a message authentication method according to the invention.

Step 19 may also be introduced before the transition 16 into the examples of FIGS. 1, 2 and 4.

Here again, it should be pointed out that it is also possible to share Y's calculation between the entity C and the verifier B.

The protocols described above may be converted into message authentication protocols or into digital signature schemes.

FIG. 4 shows steps of a method that make it possible to authenticate that a message M received by the first entity B was sent by the second entity A. In a first step 20, the entity A generates a first random number r very much greater than s and calculates $x=G^r(\bmod n)$ as in step 9. Instead of sending x to the entity B, the entity A provides a first element of proof. x' by applying, to the message M, jointly with the number x, a function h, for example equal to a cryptographic hash function or including a cryptographic hash function such that:

$$x'=h(x, M).$$

Next, the entity A sends the message M and the first element of proof x' to the entity B.

Receipt of the first element of proof x by the entity B validates a transition 21, which then activates a second step 11. The procedure then continues in the same way as that described with reference to one of FIGS. 1 to 3.

In step 11, the entity B chooses at random an integer c within a [0, t−1] security interval and sends the number c to the entity A. Thus, the number c, generated in association with the first element of proof by the entity B, is common to the entities A and B and also to any other entity infiltrating the dialogue between the entities A and B.

Receipt by the entity A of the common number c validates a transition 12, which then activates a third step 13.

In step 13, the entity A calculates y=r+sc. Thus, the entity A generates an image y of the private key in the form of a linear combination of the number r and the number s, the multiplicative coefficient of which is the common number c. Since the random number r is very large and not communicated, knowledge of the image y does not allow the product sc to be recovered, and consequently does not allow recovery of the private key number s that therefore remains kept secret by the entity A. Since only the entity A knows the number s, only the entity A can generate an image that integrates the common number c. In the example shown in FIG. 4, the entity A sends the private key image y to an intermediate entity C. As was seen previously, the image y gives no information about the private key.

Receipt of the image y by the entity C validates a transition 14, which then activates the fourth step 15.

In step 15, it is in this case the intermediate entity C that calculates the second element of proof $Y=g^y(\bmod n)$ and sends Y to B.

Receipt of the second element of proof Y by the entity. B validates a transition 16, which then activates a fifth step 22.

In step 22, the entity B calculates, as in step 17, a verification value V by means of the formula:

$$V=Y^x v^c(\bmod n)$$

and then verifies the match of the second element of proof with the first element of proof by means of the verification equation:

$$h(V, M)=x'.$$

In the alternative method of implementation using a function f, the verification equation becomes $h(f(Y^e v^c(\bmod n)),M)=x'$.

Unlike the message authentication, the message signature is independent of the sender. The signature of a message M sent by the entity A remains valid if the entity B receives the message M from any other entity.

Figure 5:
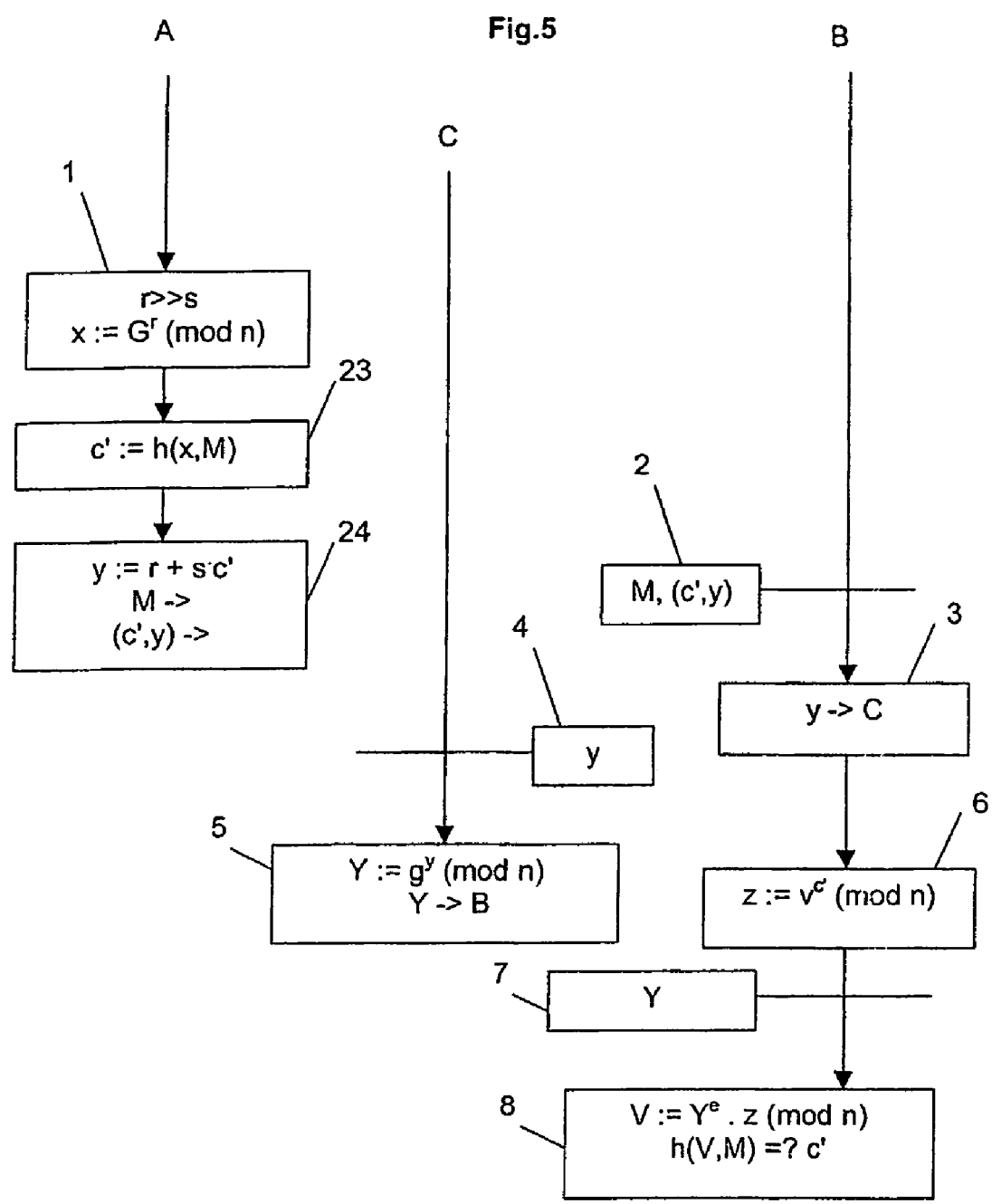
FIG. 5 shows steps of a method used for a message signature according to the invention.

Referring to figure 5, in a first step 1, the entity A generates a first random number r that is very much greater than s and calculates $x=G^r(\bmod n)$ as in step 9. The first element of proof x thus generated does not need to be sent to the entity B as it is unnecessary to authenticate a dialogue between the entities A and B in order to verify a signature.

In a second step 23 directly after step 1, the entity A generates a common number c' by applying, to the message M, jointly with the number x, a function h, for example equal to a cryptographic hash function or including a cryptographic hash function, such that:

$$c'=h(x, M).$$

In a third step 24 directly after step 23, the entity A calculates y=r+sc. Thus, the entity A generates an image y of the private key in the form of a linear combination of the number r and the number s, the multiplicative coefficient of which is the common number c. Since the random number r is very large and not communicated, knowing the image y does not allow the product sc to be recovered and consequently does not allow recovery of the private key number s, which therefore remains kept secret by the entity A. Since only the entity A knows the number s, only the entity A can generate an image that integrates the common number c'. As was seen above, the image y gives no information about the private key. The pair (c', y) constitutes a signature of the message M since this pair integrates both the message M and a private key element that guarantees that the entity A is the source of this signature.

The entity A then sends the message M and the signature (c', y) to the entity B or to any other entity.

Receipt by the entity B of the message M with its signature (c', y), coming from the entity A or from any other entity, validates a transition 2.

Receipt of the image y by the entity C validates a transition 4, which then activates a fourth step 5.

In step 5, it is in this case the intermediate entity C that calculates the second element of proof $Y=g^y(\bmod n)$ and sends Y to B.

Receipt of the second element of proof Y by the entity B validates a transition 7, which then activates a fifth step 8.

In step 8, the entity B calculates, as in step 17, a verification value V by means of the formula:

$$V = Y^e v^{c'} (\bmod n)$$

and then verifies the match of the second element of proof with the first element of proof by means of the verification equation:

$$h(V, M) = c'.$$

In this case, the match with the first element of proof is verified by this equality owing to the fact that the common number c' generated in step 23 itself matches the first element of proof.

In the alternative method of implementation using a function f, the verification equation becomes $h(f(Y^e v^{c'} (\bmod n)), M) = x'$.

Receipt of the image y by the entity C validates the transition 4 and may result from receipt of the message M with its signature (c', y) coming from the entity A or from any other entity. Referring to FIG. 5, receipt by the entity C of the image y results from a step 3 activated by the transition 2. In step 3, the entity B extracts the image y from the signature in order to send it to the entity C.

In a step 6 carried out before validation of the transition 7, the entity B extracts the common number c' from the signature in order to obtain a number z equal to $v^{c'}$, which makes it easier to calculate V in step 8.

Figure 6:
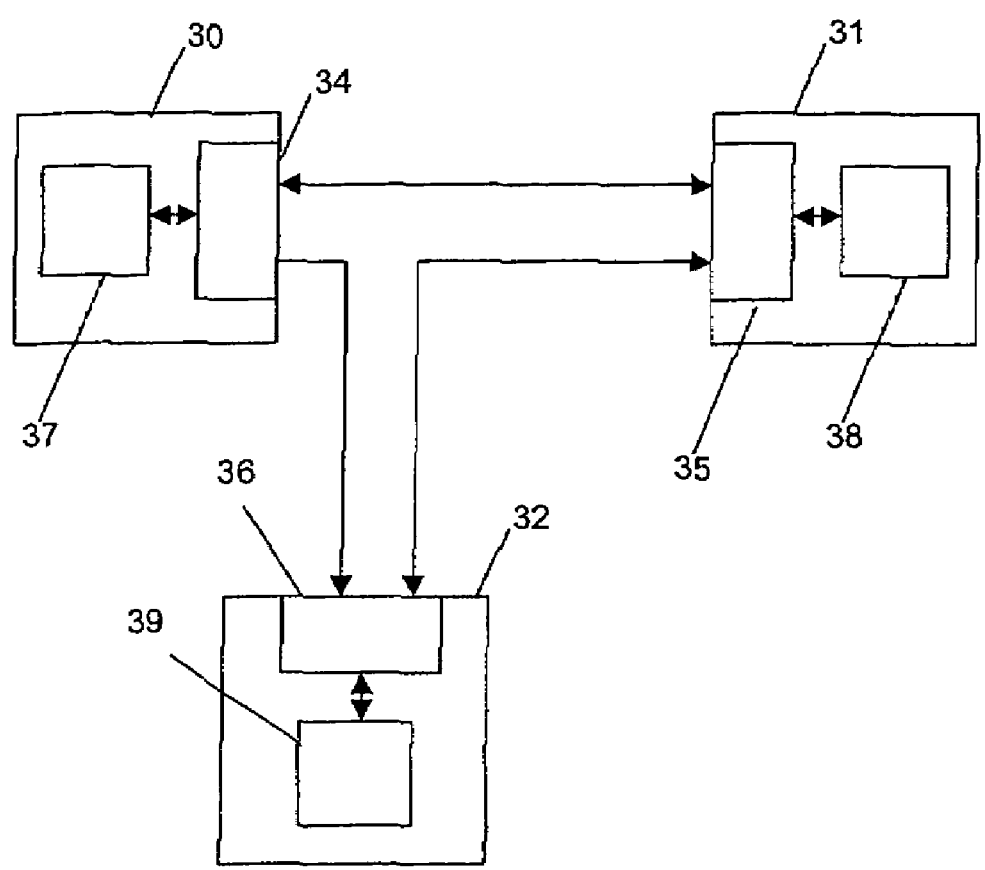
FIG. 6 shows a system implementing the method according the invention.

Referring to FIG. 6, the entities A, B and C described above are physically a prover device 30, a verifier device 31 and an intermediary device 32, respectively. The prover device 30 is, for example, a microprocessor card, such as a credit card, or a mobile telephone subscriber identification card. The verifier device 31 is, for example, a bank terminal or an electronic commerce server, or a hardware of a mobile telecommunication operator. The intermediary device 32 is, for example, a microprocessor card extension, a credit card read terminal, or an electronic mobile telephone card.

The prover device 30 comprises communication means 34 and calculation means 37. The prover device 30 is protected against intrusion. The communication means 34 are designed to send the first element of proof x, as in step 9 described with reference to FIGS. 1 to 3, the private key image y, as in step 13 described with reference to FIGS. 2 and 4, the second element of proof Y, as in step 15 described with reference to FIG. 1, the first partial image Y' with the two private key image components g' and y", as in step 18 described with reference to FIG. 3, the message M, as in step 20 or 24 described with reference to FIGS. 4 and 5 or the common number c, as in step 24 described with reference to FIG. 5 in the version of the method to be implemented. The communication means 34 are also designed to receive the common number c, as at the transition 12 described with reference to FIGS. 1 to 4 when versions of the method to be implemented correspond to authentication. For a version of the method to be implemented corresponding to a signature, the communication means 34 do not need to be designed to receive the common number c.

The calculation means 37 are designed to carry out steps 9, 13 and 15 described with reference to FIG. 1, steps 9 and 13 described with reference to FIG. 2, steps 9, 13 and 18 described with reference to FIG. 3, step 20 and 13 described with reference to FIG. 4 or steps 1, 23 and 24 described with reference to FIG. 5, depending on the version of the method to be implemented. As is known, the calculation means 37 comprise a microprocessor and microprograms or combinatory circuits dedicated to the calculations described above.

The verifier device 31 comprises communication means 35 and calculation means 38. The communication means 35 are designed to send one or more common numbers c, as in step 11 described with reference to FIGS. 1 to 4 when versions of the method to be implemented correspond to authentication. For a version of the method to be implemented corresponding to a signature, the communication means 35 do not need to be designed to send a common number c. The communication means 35 are also designed to receive the two elements of proof x and Y, as at the transitions 10 and 16 described with reference to FIGS. 1 to 3, a message M with the first element of proof x' and the second element of proof Y, as at the transitions 21 and 16 described with reference to FIG. 4 or the second element of proof and the message M with one or more common numbers c' and the private key image y, as at the transitions 2 and 8 described with reference to FIG. 5. Optionally, for a version of the method to be implemented corresponding to a signature, the communication means 35 are designed to resend the private key image y, as in step 3 described with reference to FIG. 5.

The calculation means 38 are designed to carry out steps 11, 17 and 19 described with reference to FIGS. 1 to 3, steps 11 and 22 described with reference to FIG. 4, or steps 6 and 8 described with reference to FIG. 5, depending on the version of the method to be implemented. As is known, the calculation means 38 comprise a microprocessor and microprograms, or combinatory circuits dedicated to the calculations described above.

The intermediary device 32 comprises communication means 36 and calculation means 39. The communication means 36 are designed to send the second element of proof Y, as in step 15 described with reference to FIGS. 2 and 4, as in step 25 described with reference to FIG. 3 or as in step 5 described with reference to FIG. 5. The communication means 36 are also designed to receive the private key image y, as at the transition 14 described with reference to FIGS. 2 and 4, the private key image y, as at the transition 4 described with reference to FIG. 5 or the private key partial image y" and the two components g' and Y' of the second element of proof, as at the transition 14 described with reference to FIG. 3.

The calculation means 39 are designed to carry out step 15 described with reference to FIG. 2 or FIG. 4, step 25 described with reference to FIG. 3 or step 5 described with reference to FIG. 5, depending on the version of the method to be implemented. As is known, the calculation means 39 comprise a microprocessor and microprograms, or combinatory circuits dedicated to the calculations described above.

As an improvement of the procedure, both the calculation and the communication means described above are designed to repeat the execution of the abovementioned steps k times, each time for a first element of proof and a second element of proof that differ.

The invention claimed is:

1. A cryptographic method, in which a first entity generates, by means of a private key kept secret by the first entity, a proof verifiable by a second entity by means of a public key associated with said private key, wherein said method comprises a step in which at least one element of proof is at least partly generated by open digital processing of a data item that allows the second entity to verify a match between said element of proof and another element of proof, and that does not allow said private key to be recovered, wherein the method comprises:

a first step in which the first entity generates a first element of proof by means of a first random number r kept secret by the first entity;

a second step in which one or more common numbers are generated in association with the first element of proof, so that the first entity and the second entity has knowledge of said one or more common numbers;

a third step in which the first entity generates an image y of said private key by combining at least a first private key integer with the first random number r and at least one of said common numbers; and a fourth step in which a second element of proof Y is generated by applying, to the image y of said private key, an open digital processing operation executable by any entity, so as to allow the second entity to verify a match of the first element of proof with the second element of proof Y by applying a first part of said public key to the second element of proof Y and at least a second part of said public key to the at least one of said common numbers.

2. The cryptographic method of claim 1, wherein:

in the first step, the first entity generates the first random number r, which is greater than any first integers contained in a private key kept secret by the first entity, and the first entity generates the first element of proof obtained after raising, to a power modulo n, a first integer G which may or may not be contained in said public key, and the exponent of which is the first random number r;

in the third step, the first entity generates the image y of said private key by a linear combination of the first random number r and of at least a first private key integer s, at least one multiplicative coefficient of said linear combination being said common number or one of said common numbers; and in the fourth step, the second element of proof Y generated is equal to a power modulo n of a second integer g which may or may not be contained in said public key and the exponent of which is the image y of the private key, the second integer g being such that the first integer G is a power modulo n of the second integer g with, as exponent, a third integer e which may or may not be contained in said public key.

3. The cryptographic method of claim 1, wherein, when the public key comprises specifically the modulus n whose prime numbers are known from the first entity, the first step is accelerated by using a technique called Chinese remainders.

4. The cryptographic method of claim 2, wherein the first element of proof is equal to the power modulo n of the first integer G which may or may not be contained in said public key, and the exponent of which is the first random number r.

5. The cryptographic method of claim 4, wherein the first integer G and the fourth public key integer v are given respectively by the formulae:

$$G = g^e \text{ modulo } n$$

$$V = G^{-s} \text{ modulo } n$$

and wherein the equality is verified by the formula:

$$x = Y^e v^c \text{ modulo } n.$$

6. The cryptographic method of claim 4, wherein the fourth public key integer v is given by the formula:

$$G = g^e \text{ modulo } n$$

$$v = G^s \text{ modulo } n$$

and wherein the equality is verified by the formula:

$$Y^e = v^c x \text{ modulo } n.$$

7. The cryptographic method of claim 4, wherein the first public key integer G and the fourth public key integer v are given respectively by the formulae:

$$G = g^{-e} \text{ modulo } n$$

$$v = G^{-s} \text{ modulo } n$$

and wherein the equality is verified by the formula:

$$Y^e x = v^c \text{ modulo } n.$$

8. The cryptographic method of claim 4, wherein:

in the second step, two common numbers a and b are generated for the first element of proof x;

in the third step, the linear combination is given by the formula:

$$y = a \cdot r + b \cdot s$$

in the fifth step, the match is verified by the equality:

$$Y^e v^b = x^a \text{ modulo } n.$$

9. The cryptographic method of claim 4, wherein, the private key comprises at least two secret numbers s1, s2, wherein:

the second step includes generating at least two common numbers c1, c2, corresponding to secret numbers s1, s2, to form the first element of proof;

the third includes calculating the linear combination by at least the formula:

$$y = r + c1 \cdot s1 + c2 \cdot s2;$$

and further comprising a fifth step in which a match is determined between the first element of proof and a product modulo n of a power of the second element of proof Y, the match being verified by at least two fourth public key integers v1, v2, by means of at least the equality:

$$Y^e v1^{c1} v2^{c2} = x \text{ modulo } n.$$

10. The cryptographic method of claim 2, wherein, in the fourth step, the second element of proof Y is sent to the second entity and wherein the method includes a fifth step in which the second entity verifies that the first element of proof matches a product modulo n of a power of the second element of proof Y, the exponent of which is the third integer e, and of a power of a fourth integer v contained in said public key, the exponent of which is said common number c.

11. The cryptographic method of claim 10, wherein, in the fifth step, the match is verified when the first element of proof is equal to the product modulo n of the power of the second element of proof Y, the exponent of which is the third integer e, and of the power of the fourth integer v contained in said public key, the exponent of which is said common number c.

12. The cryptographic method of claim 10, wherein, in the fifth step, the match is verified when the first element of proof is equal to a function of a digital message M to which the first element of proof is attached and of the product modulo n of the power of the second element of proof Y, the exponent of which is the third integer e, and of the power of the fourth integer v contained in said public key, the exponent of which is said common number c.

13. The cryptographic method of claim 10, wherein, in the fifth step, the match is verified when the common number is equal to a function of the digital message M and of the product modulo n of the power of the second element of proof Y, the exponent of which is the third integer e, and of the power of the fourth integer v contained in said public key, the exponent of which is said common number c.

14. The cryptographic method of claim 10, wherein the first element of proof is equal to a function f of the power modulo n of the first integer G which may or may not be contained in said public key, and the exponent of which is the first random number r, and in that the verification of the fifth step is made on the result of this function.

15. The cryptographic method of claim 1, wherein the fourth step is executed by any entity that is other than the first entity and that receives the image y of said private key from the first entity.

16. The cryptographic method of claim 1, wherein the fourth step is executed by the first entity.

17. The cryptographic method of claim 1, wherein the fourth step comprises:
a first substep in which the first entity decomposes the image y of said private key into a first partial image y" represented by the u low-order bits of a data word which represents the image y and into a second partial image y'" represented by the remaining high-order bits of said data word, and in which the first entity generates a first component Y" and a second component g" of the second element of proof, said components being such that:

$$Y''=g^{y''} \text{ modulo } n$$

$$g''=g^{2u} \text{ modulo } n$$

and in which substep the first entity sends the first component Y", the second component g" and the second partial image y'" to an intermediate entity; and
a second substep in which the intermediate entity generates the second element of proof Y by multiplying the first component Y" by a power of the second component g" with the second partial image y'" as exponent, and in which the intermediate entity sends the second element of proof Y to the second entity.

18. The cryptographic method of claim 1, wherein the second step is executed by the second entity which, for the first element of proof received from the first entity, chooses at least one common number within a security interval and sends said common number to the first entity.

19. The cryptographic method of claim 1, wherein the second step is executed by the first entity which generates at least one common number on the basis of the first element of proof and of a digital message M to which said common number is attached.

20. The cryptographic method of claim 1, wherein the public key comprises at least one precalculated value of the first element of proof so as to start the method at the second step.

21. The cryptographic method of claim 20, wherein the public key comprises a quantity k of precalculated values of the first element of proof and wherein execution of the second step to the fourth step is iterated k times with, for each iteration, a different value of the first element of proof.

22. A prover device, provided with a private key kept secret and protected against any intrusion, for generating a proof, a verification of which using a public key associated with said private key makes it possible to guarantee that the device is the origin of said proof, wherein said device comprises:
calculation means designed to generate a first element of proof, on the basis of a first random number kept secret in the device, and to generate an image of said private key by combining at least a first private key integer with the first random number and at least one of several common numbers associated with the first element of proof, in such a way that it is possible to generate a second element of proof by applying an open digital processing operation to said private key image that makes it possible to verify a match of the first element of proof with the second element of proof by applying a first part of said public key to the second element of proof and at least a second part of said public key to at least one of said common numbers; and
communication means designed to transmit at least said first element of proof.

23. The prover device of claim 22, wherein:
the calculation means are, on the one hand, designed to generate the first random number, which is greater than any first integer s contained in the private key, kept secret, and to generate the first element of proof by raising, to a power modulo n, a first integer G which may or may not be contained in said public key with, as exponent, the first random number r; and
the calculation means are, on the other hand, designed to generate the image of said private key by a linear combination of the first random number and of at least a first private key integer s, at least one multiplicative coefficient of said linear combination being said common number or one of said common numbers.

24. The prover device of claim 23, wherein:
the calculation means are designed to decompose the image into a first partial image y" represented by the u low-order bits of a data word which represents the image and into a second partial image y'" represented by the remaining high-order bits of said data word, and to generate a first component Y" and a second component g" of the second element of proof, said components being such that:

$$Y''=g^{y''} \text{ modulo } n$$

$$g''=g^{2u} \text{ modulo } n$$

where g is a second integer such that the first public key integer G is a power modulo n of the second integer g with, as exponent, a third integer e contained in said public key; and
the communication means are designed to transmit the first component Y", the second component g" and the second partial image y'".

25. The prover device of claim 23, wherein the calculation means are designed to generate the first element of proof by raising, to a power modulo n, a first integer G which may or may not be contained in said public key and the exponent of which is the first random number r.

26. The prover device of claim 25, wherein the first public key integer G and a fourth public key integer v are given respectively by the formulae:

$$G=g^e \text{ modulo } n$$

$$v=G^{-s} \text{ modulo } n.$$

27. The prover device of claim 25, wherein the first public key integer G and a fourth public key integer v are given respectively by the formulae:

$$G = g^e \bmod n$$

$$v = G^s \bmod n.$$

28. The prover device of claim 25, wherein the first public key integer G and a fourth public key integer v are given respectively by the formulae:

$$G = g - e \bmod n$$

$$v = G^{-s} \bmod n.$$

29. The prover device of claim 25, wherein the calculation means are designed to generate the private key image by a linear combination of two common numbers a and b according to the formula:

$$y = a \cdot r + b \cdot s.$$

30. The prover device of claim 25, wherein, the private key comprises at least two secret numbers s1, s2, wherein:
the calculation means are designed to generate least two common numbers c1, c2, which correspond to secret numbers s1, s2, that are associated with the first element of proof;
the calculation means are designed to generate the private key image by a linear combination according to at least the formula:

$$y = r + c1 \cdot s1 + c2 \cdot s2.$$

31. The prover device of claim 23, wherein, when the public key comprises specifically the modulus n whose prime numbers are kept secret in the prover device, the calculation means are designed to calculate the exponentiations using a technique called Chinese remainders.

32. The prover device of claim 22, the communication means are designed to receive said common number(s) after having transmitted the first element of proof.

33. The prover device of claim 22, wherein the communication means are designed to transmit the private key image.

34. The prover device of claim 22, wherein the calculation means are designed to generate the second element of proof.

35. The prover device of claim 22, wherein the calculation means are designed to generate at least one common number on the basis of the first element of proof and of a digital message M to which said common number is attached.

36. The prover device of claim 22, wherein, when the public key comprises a quantity k of precalculated values of the first element ofproofx, the calculation means are designed to iterate k times each execution with, for each iteration, a different value of the first element of proof.

37. The prover device of claim 22, wherein the first element of proof is equal to a function f of the power modulo n of the first integer G which may or may not be contained in said public key and the exponent of which is the first random number r.

38. A cryptographic system in which a first entity generates, by means of a private key kept secret by the first entity, a proof verifiable by a second entity by means of a public key associated with said private key, wherein at least one element of proof is at least partly generated by open digital processing of a data item that allows the second entity to verify a match between said element of proof and another element of proof, and that does not allow said private key to be recovered, wherein the system compnses:

a prover device provided with the private key kept secret and protected against any intrusion, for generating the proof, a verification of which using the public key associated with said private key makes it possible to guarantee that the prover device is the origin of said proof, the prover device including:
prover calculation means designed to generate a first element of proof, on the basis of a first random number r kept secret in the prover device, and to generate an image of said private key by combining at least a first private key integer with the first random number r and at least one of several common numbers associated with the first element of proof, in such a way that it is possible to generate a second element of proof Y by applying an open digital processing operation to said private key image that makes it possible to verify a match of the first element of proof with the second element of proof Y by applying a first part of said public key to the second element of proof and at least a second part of said public key to at least one of said common numbers; and
prover communication means designed to transmit at least said first element of proof.

39. The cryptographic system of claim 38 further comprising an intermediary device for being introduced downstream of the prover device, wherein said intermediary device comprises an intermediary calculation means for generating at least one element of proof by open digital processing of an image y of said private key, said image y of said private key not allowing said private key to be recovered.

40. The cryptographic system of claim 39, wherein said intermediary device further comprises an intermediary communication means designed to receive said image y of said private key.

41. The cryptographic system of claim 40, wherein the intermediary calculation means are designed to generate the second element of proof Y by raising, to a power modulo n, a second integer g contained in said public key, the exponent of which is the private key image y.

42. The cryptographic system of claim 39, wherein said intermediary device further comprises an intermediary communication means designed to receive a first partial image y" of the private key, a first component Y" and a second component g" of the second element of proof Y and wherein the intermediary calculation means are designed to generate the second element of proof Y by multiplying the first component Y" by a power of the second component g" with the second partial image y" as exponent.

43. The cryptographic system of claim 38, further comprising a verifier device for verifying that a proof has been issued by the prover device, wherein said verifier device comprises:
verifier communication means designed to receive the first element of proof and the second element of proof Y; and
verifier calculation means designed to verify a match of the first element of proof with the second element of proof Y by applying a first part of said public key to the second element of proof Y and at least a second part of said public key to at least one of several common numbers generated in association with the first element of proof.

44. The cryptographic system of claim 43, wherein the verifier calculation means are designed to choose at least one common number within a security interval after receiving the first element of proof and wherein the verifier communication means are designed to transmit said common number.

45. The cryptographic system of claim 44, wherein, the private key comprises at least two secret numbers s1, s2, wherein:
the verifier calculation means are designed to choose at least two common numbers c1, c2, corresponding to secret numbers s1, s2, to form the first element of proof; and
the verifier calculation means are designed to verify the match by at least two fourth public key integers v1, v2, by means of at least the equality:

$Y^e v1^{c1} v2^{c2} = x$ modulo n.

46. The cryptographic system of claim 43, wherein the verifier calculation means are designed to verify that the first element of proof matches with a product modulo n of a power of the second element of proof Y, the exponent of which is a third integer e, and of a power of a fourth integer v, the exponent of which is said common number c, the third integer and the fourth integer being contained in said public key.

47. The cryptographic system of claim 46, wherein the verifier calculation means are designed to declare the match verified when the first element of proof is equal to the product modulo n of the power of the second element of proof Y, the exponent of which is the third integer e, and of the power of the fourth integer v contained in said public key, the exponent of which is said common number c.

48. The cryptographic system of claim 47, wherein the equality is verified by the formula:

$x = Y^e v^c$ modulo n.

49. The cryptographic system of claim 47, wherein the equality is verified by the formula:

$Y_e = v^c x$ modulo n.

50. The cryptographic system of claim 47, wherein the equality is verified by the formula:

$Y^e x = v^c$ modulo n.

51. The cryptographic system of claim 47, wherein the match is verified by the equality:

$Y^e v^b = x^a$ modulo n.

52. The cryptographic system of claim 46, wherein the verifier calculation means are designed to declare the match verified when the first element of proof is equal to a function of a digital message M to which the first element of proof is attached and of the product modulo n of the power of the second element of proof Y, the exponent of which is the third integer e, and of the power of the fourth integer v contained in said public key, the exponent of which is said common number c.

53. The cryptographic system of claim 46, wherein the verifier calculation means are designed to declare the match verified when the common number is equal to a function of a digital message M and of the product modulo n of the power of the second element of proof Y, the exponent of which is the third integer e, and of the power of the fourth integer v contained in said public key, the exponent of which is said common number c.

54. The cryptographic system of claim 46, wherein, when the first element of proof is equal to a function f of the power modulo n of the first integer G which may or may not be contained in said public key, and the exponent of which is the first random number r, the calculation means are designed to carry out the verification on the result of this function.

55. The cryptographic system of claim 43, wherein the verifier calculation means comprise, in memory, at least one precalculated value of the first element of proof considered as part of the public key.

56. The cryptographic system of claim 55, wherein the verifier calculation means comprise, in memory, a quantity k of precalculated values of the first element of proof, wherein the verifier communication means are designed to receive k second elements of proof and wherein the verifier calculation means are designed to verify a match of each second element of proof Y received with a different value of the first element of proof.

57. The cryptographic system of claim 43, wherein the intermediary communication means are designed to transmit at least one of the first element of proof and the second element of proof Y to the verifier device.

* * * * *